(12) United States Patent
Bhat

(10) Patent No.: US 6,438,374 B1
(45) Date of Patent: Aug. 20, 2002

(54) DYNAMIC MULTI-STEP OVERLOAD CONTROL FOR MESSAGE PROCESSING IN WIRELESS COMMUNICATION SERVICE NETWORK

(75) Inventor: Kabekode Venkata Bhat, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/320,604

(22) Filed: May 26, 1999

(51) Int. Cl.[7] ................................. H04Q 7/20
(52) U.S. Cl. .................... 455/423; 455/424; 455/8; 455/9; 455/67.1; 379/113
(58) Field of Search .................... 455/423, 424, 455/8, 9, 67.1, 445, 458, 453; 379/113, 221, 221.06, 221.07, 112.08, 224, 112.06, 112.05

(56) References Cited

U.S. PATENT DOCUMENTS

| | | | | |
|---|---|---|---|---|
| 5,513,255 A | * | 4/1996 | Yoo et al. | 379/133 |
| 5,539,815 A | * | 7/1996 | Samba | 379/220 |
| 5,548,533 A | * | 8/1996 | Gao et al. | 364/514 |
| 5,655,120 A | * | 8/1997 | Witte et al. | 395/675 |
| 5,892,818 A | * | 4/1999 | Lee | 379/112 |
| 5,943,232 A | * | 8/1999 | Gehi et al. | 364/184 |
| 6,259,776 B1 | * | 7/2001 | Hunt | 379/113 |
| 6,266,531 B1 | * | 7/2001 | Zadeh et al. | 455/453 |
| 6,336,034 B1 | * | 1/2002 | Namura et al. | 455/424 |
| 6,356,629 B1 | * | 3/2002 | Fourie et al. | 379/112.1 |

* cited by examiner

Primary Examiner—Daniel Hunter
Assistant Examiner—Lana Le
(74) Attorney, Agent, or Firm—Walter W. Duft

(57) ABSTRACT

A wireless communication service network includes a message processing system with at least two programmable application processors (APs) providing operational, administrative and maintenance support for one or more cell base stations in the network serving one or more wireless radio units. Improved control of the AP message processing resources is provided in response to an AP shutdown condition. In accordance with the improvement, an initial overload control (OLC) threshold is set for the APs, and the APs are monitored during their operation as they perform message processing. In the event that one of the APs becomes non-operational (non-operating AP), the OLC threshold relative to one or more remaining operational APs is dynamically increased. The message processing functions of the non-operational AP are then redistributed to one or more remaining operational APs, whereby improved load sharing is provided among the remaining operational APs and the likelihood of a catastrophic processing failure is minimized.

21 Claims, 3 Drawing Sheets

DYNAMIC MULTI-STEP OVERLOAD CONTROL FOR MESSAGE PROCESSING IN WIRELESS COMMUNICATION SERVICE NETWORK

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to wireless communication service networks, including networks servicing cellular telephones, personal communication systems, and the like. More particularly, the invention concerns a wireless message processing system and the control of message processing resources therein in response to a processor shutdown condition.

2. Description of the Prior Art

Wireless communication service networks employ message processing systems that provide operational, administrative and maintenance functionality in support of cell base stations that communicate with wireless radio units. When a call is originated from, or terminated to, a wireless radio unit located in a cell managed by a cell base station, the message processing system serving the base station routes signaling messages that enable the base station to perform the necessary call set-up, knock-down, hand-off and paging functions. Message processing support may also be implemented for subscriber-specific intelligent network services, such as Call Forwarding, Call Waiting, Three-way Calling, Calling Line Identification and the like.

Existing message processing systems are implemented using programmed computers. These are referred to by various names, including Application Processors (APs), Base Station Controllers (BSC) and the like. For convenience, the terms "Application Processor" and "AP" will sometimes be used hereinafter to refer to components of the message processing system described herein. It will be understood that the use of such terms is not intended to signify any particular architecture or commercial product offering.

Overload in a network message processing system can occur as a result of excessive message traffic and over-demand for system functions. This can cause messaging delays and lower quality of service to wireless subscribers. As such, conventional message processing systems typically implement OverLoad Control (OLC) functionality, whereby message processing is throttled (e.g., messages are dropped) if system usage exceeds a predetermined OLC threshold relative to some operational benchmark. A typical benchmark is CPU utilization, and a CPU utilization rate of 80% is sometimes used as the OLC threshold. When an AP in a message processing system reaches this threshold, message throttling is invoked, and continues until the AP is out of the overload condition.

In some wireless communication service networks, such as the FLEXENT™ system from Lucent Technologies Inc., message processing and other network functions are implemented on behalf of cell base stations by clusters of APs arranged in a networked environment. In the event that one AP shuts down (e.g., it fails unexpectedly or is intentionally taken out of service), the AP's message processing functions can be off-loaded to other APs. Although this procedure may work satisfactorily in an environment where overall CPU utilization is low, it can fail if CPU utilization is already at or near the OLC threshold for the other APs. For example, if CPU utilization is already at 75% for all APs in a system that uses an 80% OLC threshold, there may not be enough excess capacity to take up the messaging load from the non-operating AP. Using a single OLC threshold for all APs in a cluster thus may not provide effective overload control in the event of an AP shutdown. Effective message processing cannot occur if the remaining APs, although not overloaded, do not have spare capacity to take up the messaging load from the non-operating AP.

Accordingly, there is a need in a wireless communication service network, and particularly a network implementing clustered APs, for improved control of message processing resources in response to an AP shutdown condition. What is required is a message control system that is dynamically responsive to an AP shutdown condition in order to promote improved load sharing among remaining operational APs and to minimize the likelihood of a catastrophic processing failure.

SUMMARY OF THE INVENTION

A solution to the foregoing problem is provided in a wireless communication service network that includes a message processing system with at least two programmable application processors (APs) providing operational, administrative and maintenance support for one or more cell base stations in the network serving one or more wireless radio units. Improved control of AP message processing resources is provided in response to an AP shutdown condition. In accordance with the improvement, an initial AP OLC threshold is set for the APs, and the APs are monitored during their operation as they perform message processing. In the event that one of the APs becomes non-operational (non-operating AP), the OLC threshold relative to remaining operational APs is dynamically increased. The message processing functions of the non-operating AP are then redistributed to the operational APs.

The foregoing functions can be implemented by software or firmware programming in a control processor that monitors and directs the activities of the APs, or by programming in the APs themselves. The initial OLC threshold is preferably selected at a level that allows sufficient upward threshold adjustment to enable all remaining operational APs in the message processing system to absorb the message processing functions of the non-operating AP. This initial OLC threshold can be determined by performance modeling or by observation of the wireless communication service network during actual or simulated operations with and without a non-operating AP in place. More particularly, the initial threshold can be determined on the basis of processor utilization and message delay considerations with all APs being operational, and following the shut down of an AP with the remaining operational APs carrying an increased load.

The APs may either be paired or unpaired. If the APs are paired, the OLC threshold adjustment following an AP shutdown is performed by adjusting the OLC threshold for the paired mate of the non-operating AP. The message processing functions of the non-operating AP are then redistributed to the mate AP. If the APs are not paired, the OLC threshold adjustment following an AP shutdown is performed by adjusting the OLC threshold for some, and preferably all, of the remaining operational APs in the message processing system or in an AP cluster therein. The processor functions of the non-operating AP are then be distributed to at least some, and preferably all, of the remaining operational APs.

BRIEF DESCRIPTION OF THE DRAWING

The foregoing and other features and advantages of the invention will be apparent from the following more particular description of a preferred embodiment of the invention, as illustrated in the accompanying Drawing, in which.

DETAILED DESCRIPTION OF THE PREFERRED EMBODIMENT

Figure 1:
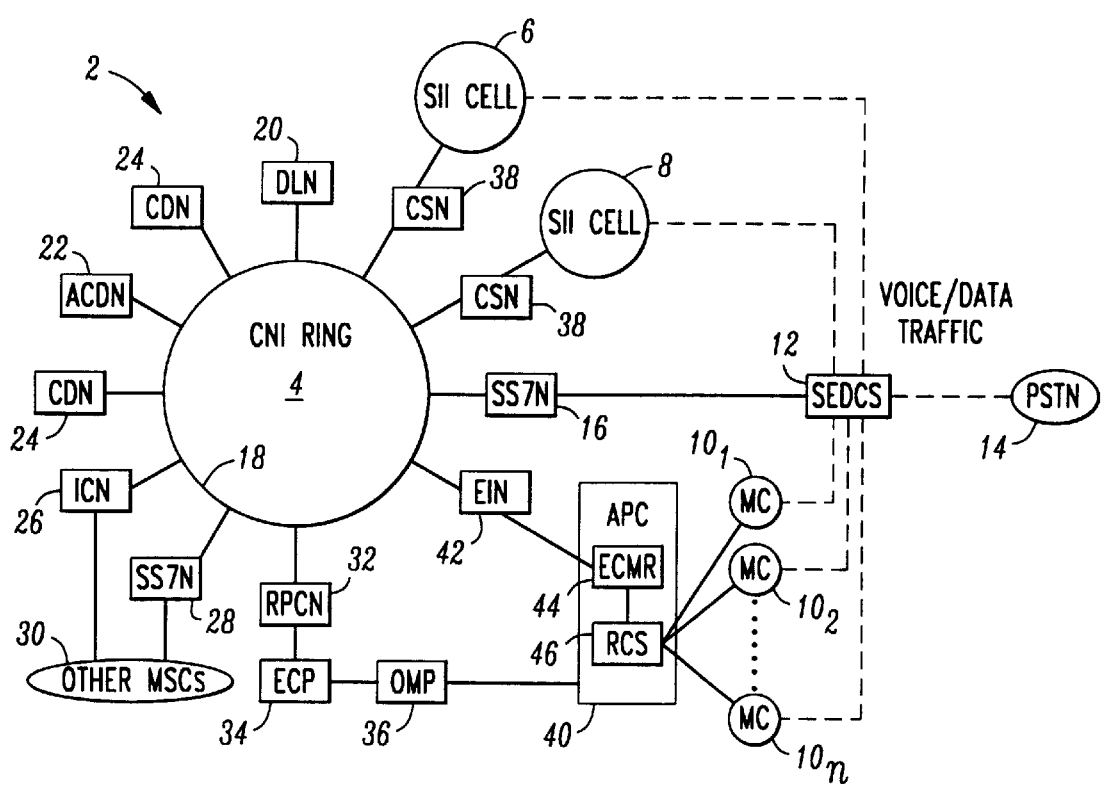
FIG. 1 is a functional block diagram showing elements of an exemplary mobile wireless communication network that supports wireless messaging.

Turning now to the figures, wherein like reference numerals represent like elements in all of the several views, FIG. 1 illustrates an exemplary mobile wireless communication network 2. The wireless network 2 includes a mobile switching center (MSC) 4 that provides call support for plural cell base stations, including those shown by reference numerals 6 and 8. As is known in the art, each base station 6 and 8 serves wireless units operating within a defined geographic area known as a cell. The MSC further supports a species of cell commonly referred to as a microcell (MC). An arrangement of cell base stations $10_1$, $10_2$ ... $10_n$, serves wireless units operating within these microcells. The microcells served by the cell base stations $10_1$, $10_2$ ... $10_n$ are smaller versions of the cells served by the cell base stations 6 and 8. They are especially suited for extending wireless network coverage into high traffic areas, such as buildings, as well as sparsely populated low traffic areas.

As is conventional, the cell base stations 6, 8 and $10_1$, $10_2$ ... $10_n$ route voice (or data) traffic to and from wireless radio units within their respective cells via a digital cellular switch 12, which could be implemented using a 5EDCS™ switch from Lucent Technologies, Inc. The switch 12 is located as part of the MSC 4 and provides a switched connection therefrom to the Public Switched Telephone network 14. This traffic routing is illustrated by the dashed line pathways shown in FIG. 1. The cell base stations also route signaling messages through the MSC 4, and specifically through a signaling node 16 that connects to the switch 12. As is conventional, the signaling node 16 could be implemented using the Signaling System 7 (SS7) standard, and may thus be referred to as an SS7 Node (SS7N).

As will be understood by persons skilled in the art, the MSC 4 conventionally includes a Common Node Interface (CNI) ring 18 that provides communication between a plurality of ring nodes. These include a Direct Link Node (DLN) 20, an Administrative DLN (ACDN) 22, and one or more Call processing Database Nodes (CDN) 24. Also connected to the CNI ring 18, is an Intersystem Cellular Node (ICN) 26 and a second SS7N 28 which provide communication between the MSC 4 and other MSCs 30. A Ring Peripheral Controller Node (RPCN) 32 is further connected to the CNI ring 18 and provides a connection to an Executive Cellular Processor (ECP) 34 and an Operations and Maintenance Processor (OMP) 36, that together control and manage the MSC 4.

The cell base stations 6, 8 and $10_1$, $10_2$ ... $10_n$ can connect to the MSC 4 in one of two different ways. As shown in FIG. 1, the cell base stations 6 and 8 are connected using Cell Site Nodes (CSN) 38. Among other things, the CSNs 38 route signaling messages between cell base stations 6 and 8 and the SS7N 16 connected to the switch 12. The cell base stations $10_1$, $10_2$ ... $10_n$ connect to the MSC 4 in a different way. Namely, they connect to the CNI ring 18 via an Application Processor Complex (APC) 40 and an Ethernet Interface Node (EIN) 42.

The APC 40 illustrated in FIG. 1 represents a collection of APs and/or AP clusters that are interconnected to provide a network message processing environment. Each networked AP is a programmed computer that conventionally includes various layers of software modules functionality. This conventional functionality includes an ECP Complex Message Router (ECMR) that processes messages to and from other nodes on the CNI ring 18, and a base station software (or firmware) control application that is commonly known as a Radio Cluster Server (RCS). In FIG. 1, the ECMR software modules for all APs in the APC 40 are illustrated collectively by reference numeral 44, which shall be referred to hereinafter as the ECMR 44. Likewise, the RCS software modules for all APs in the APC 40 are illustrated collectively by reference numeral 46, which shall be referred to hereinafter as the RCS 46.

The APC 40 provides centralized call processing and operational, administrative and management functionality to support the cell base stations $10_1$, $10_2$ ... $10_n$, which, by design, are constructed with smaller, less hardware-intensive radio components and fewer processing resources than the cell base stations 6 and 8. A client/server network is effectively implemented in which hardware and processing redundancy are minimized by moving such resources from the cell base stations $10_1$, $10_2$ ... $10_n$, which represent client nodes in the network, to the APC 40, which acts as the network server. It will appreciated by persons skilled in the art that although FIG. 1 shows only one APC, additional APCs could also be added to the MSC 4, via node connections to the CNI ring 18.

Figure 2:
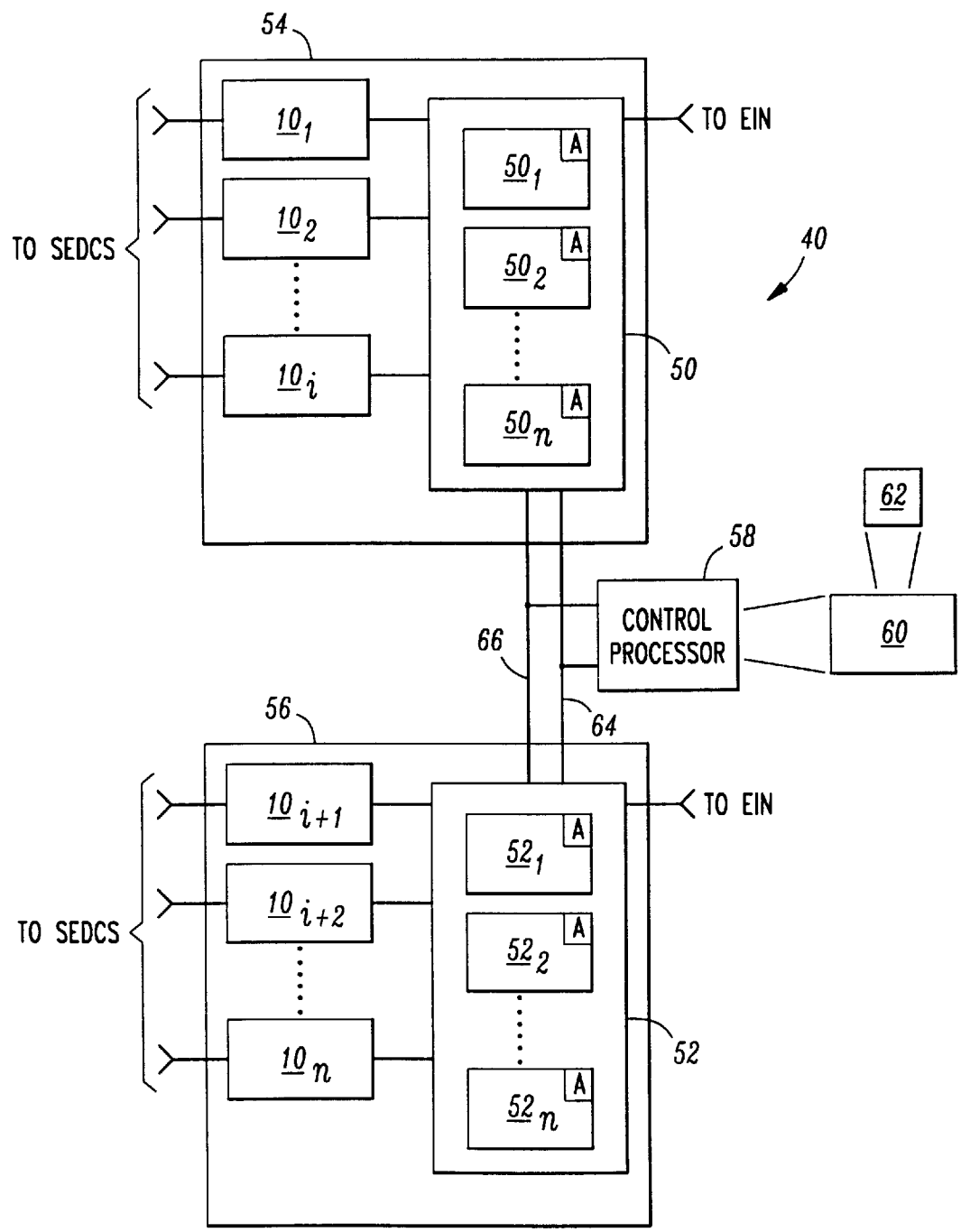
FIG. 2 is a functional block diagram showing a pair of application processor clusters that could be used to support wireless messaging in the mobile wireless communication network of FIG. 1.

Turning now to FIG. 2, the APC 40 can hold multiple AP Clusters (APCLs), each containing multiple APs. Two such APCLs are shown by reference numerals 50 and 52, respectively. APCL 50 contains APs $50_1$, $50_2$ ... $50_n$. APCL 52 contains APs $52_1$, $52_2$ ... $52_n$. Typically, each APCL 50 and 52 would contain up to eight APs, although more could be added as necessary. The APCLs 50 and 52 support plural groups of cell base stations. More specifically, APCL 50 is part of a sub-network 54 in which it supports a group of cell base stations $10_1$, $10_2$ ... $10_i$. Likewise, APCL 52 is part of a sub-network 56 in which it supports a group of cell base stations $10_{i+1}$, $10_{i+2}$ ... $10_n$.

The APs $50_1$, $50_2$ ... $50_n$ and $52_1$, $52_2$ ... $52_n$ are programmed to perform message processing in order to provide a variety of operational, administrative and management functions on behalf of the cell base stations they serve. This message processing includes routing call-related messages between the cell base stations and the PSTN 14, between the cell base stations and one or more nodes connected to the MSC 4 (or other MSCs), and between the cell base stations and other cell base stations served by the APC 40. Such messages include requests for call hand-off support, home location support, paging, call set-up, call tear-down and other well known wireless communication service network functions. Additional messages that can be routed by the APs $50_1, 50_2 \ldots 50_n$ and $52_1, 52_2 \ldots 52_n$ include the intelligent network signaling used to implement user-specific custom calling features such as Call Forwarding, Call Waiting, Three-way Calling, Calling Line Identification and the like.

The APs $50_1, 50_2 \ldots 50_n$ and $52_1, 52_2 \ldots 52_n$ are preferably programmed computers that execute software or firmware programs which implement the above-described message processing functions. As described above, each runs its own local copy of the ECMR 44 and the RCS 46. Although not shown in FIG. 2, each AP $50_1, 50_2 \ldots 50_n$ and $52_1, 52_2 \ldots 52_n$ also maintains a network interface to a common local area network of APs that allows the APs to communicate with each other and with the EIN 42. The network communication pathways 64 and 66, described in more detail below, are part of this network.

As shown in FIG. 2, the base stations $10_1, 10_2 \ldots 10_n$ are connected to route voice (or data) traffic to the switch 12. The base stations $10_1, 10_2 \ldots 10_i$ in the sub-network 54 are further connected to exchange messages with the APs $50_1$, through $50_n$ in the APCL 50. Likewise, the base stations $10_{i+1}, 10_{i+2} \ldots 10_n$ in the sub-network are further connected to exchange messages with the APs $52_1$ through $52_n$ in the APCL 52. Although not shown in FIG. 2, a switching fabric is conventionally provided between the base stations $10_1, 10_2 \ldots 10_n$ and the APs $501, 50_2 \ldots 50_n$ and $52_1, 52_2 \ldots 52_n$, to establish the necessary message traffic connections. A conventional communication control module (not shown) is further provided within each AP $50_1, 50_2 \ldots 50_n$ and $52_1, 52_2 \ldots 52_n$ to process the message traffic carried over the switched connections.

To implement the AP control functions of the present invention, the APs $50_1, 50_2 \ldots 50_n$ and $52_1, 52_2 \ldots 52_n$ may be programmed to control their own operations in response to an AP shutdown condition, using appropriate inter-AP network communication to monitor the status of the other APs. Preferably, however, a Control Processor (CP) 58 is utilized. The CP 58 is a programmed computer that includes a CPU (not shown) and an appropriate data storage medium 60 having a software or firmware program 62 recorded thereon for implementing the AP control functions now to be described. The CP 58 maintains a network interface and is connected to each APCL 50 and 52, and to each of the APs $50_1, 50_2 \ldots 50_n$ and $52_1, 52_2 \ldots 52_n$ therein, via the network communication pathways 64 and 66. Each of the APs $50_1, 50_2 \ldots 50_n$ and $52_1, 52_2 \ldots 52_n$ preferably includes a software or firmware agent, shown by reference letter "A" in FIG. 2, that provides monitoring information to, and receives control information from, the CP 58. The agents also implement OLC on behalf of their respective APs in response to message processing overload conditions.

In accordance with the invention, the APCLs 50 and 52, together with the CP 58, exemplify a message processing system in a wireless communication service network that includes at least two programmable APs providing operational, administrative and maintenance support for the one or more cell base stations, which in turn provide communication services to one or more wireless radio units. As will now be described, improved control of AP message processing resources is provided in response to an AP shutdown condition in order to promote improved load sharing among remaining operational APs and to minimize the likelihood of a catastrophic message processing failure.

Figure 3:
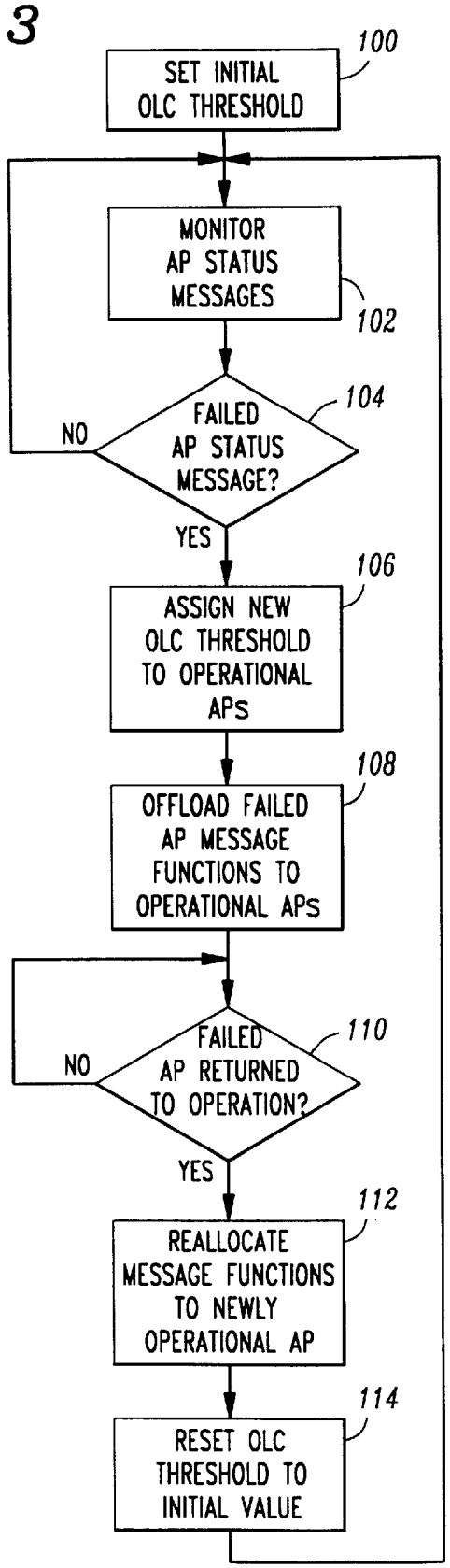
FIG. 3 is a flow diagram illustrating an exemplary dynamic multi-step message overload control process in accordance with the present invention.

Turning now to FIG. 3, an exemplary procedure is shown in which the CP 58, via its software or firmware control program 62, provides the requisite control functions for managing AP message processing in response to an AP shutdown condition. In a first step 100, the CP 58 sets an initial OLC threshold for each of the APs $50_1, 50_2 \ldots 50_n$ and $52_1, 52_2 \ldots 52_n$ by transmitting a threshold value to each AP's agent. A preferred operational benchmark which can be used for the OLC threshold is CPU utilization. CPU utilization is typically expressed as a percentage, with the maximum possible CPU utilization rate being 100%. The initial OLC threshold is normally set by the CP 58 whenever the cell base stations $10_1, 10_2 \ldots 10_n$ go on line and the APs $50_1, 50_2 \ldots 50_n$ and $52_1, 52_2 \ldots 52_n$ commence message processing operations.

The AP agents use the assigned OLC threshold value to control AP operations. If the threshold is based on CPU utilization, for example, the AP agent continuously monitors CPU operations to determine whether the threshold is exceeded. If the OLC threshold is exceeded in any AP, the agent for that AP instructs the AP to begin throttling messages, e.g., by dropping them.

In step 102, the CP 58 monitors all status messages sent to it by the APs $50_1, 50_2 \ldots 50_n$ and $52_1, 52_2 \ldots 52_n$. Each time a status message is received, the CP 58 determines in step 104 whether the status message is a special status message indicating that there is a shutdown condition in one of the APs. If the status message is not of this type, the CP 58 loops back to step 102 to continue status message monitoring. At some point, a special status message may be detected in step 104, indicating that one of the APs has become non-operational (hereinafter referred to as a non-operating AP). This causes the CP 58 to invoke step 106, in which the OLC threshold relative to one or more (preferably all) of the remaining operational APs is dynamically increased. More specifically, the CP 58 instructs the agents of such APs to increase their OLC thresholds to a new level that provides sufficient processing capacity to accommodate the message processing functions of the non-operating AP.

In step 108, the message processing functions of the non-operating AP are redistributed to one or more (preferably all) of the remaining APs. This can be done in several ways. In one exemplary configuration, each cell base station $10_1, 10_2 \ldots 10_n$ is assigned during system initialization to one active AP and one or more alternate APs. The switching fabric described above is used to establish ("nail up") switched message transmission links (e.g., DSO channels) for each connection, but only one link is actively used by a cell base station at any given time. Each cell base station is responsible for its own rerouting. The cell base stations monitor their active message transmission links and, when a failure is sensed (e.g., via a "time out" condition), the cell base stations actively linked to the non-operational AP reroute their messages on one (or more) of the pre-assigned alternate links.

In another exemplary configuration for implementing step 108, an intelligent switching fabric is employed to establish active connections between respective ones of the cell base stations $10_1, 10_2 \ldots 10_n$ and the APs $50_1, 50_2 \ldots 50_n$ and $52_1, 52_2 \ldots 52_n$. An intelligent switching database is maintained (using APC data storage resources) that identifies cell base station/AP connection combinations. The intelligent switching database can be controlled by the CP 58 (or by some other processor within the APC 40). When an AP becomes non-operational, the connections to that AP fail and the intelligent switching database controller detects the failure condition. The controller then sets up new connections between the affected base stations and one or more of the remaining operational APs. Advantageously, the intelligent switching database can be populated with alternate connectivity information based on modeling to assure deterministic connections to APs that have sufficient available processing capabilities. Other hardware and software connection redistribution variants could also be used to redistribute messaging traffic loads in a predetermined fashion.

Message redistribution continues in step 108 until the CP 58 detects in step 110 that the non-operating AP has returned to operational status. When this occurs, step 112 is implemented. The original message transmission connections are reestablished to the newly operational AP, and the AP begins receiving its normal allocation of messages. In addition, in step 114, the OLC threshold for all APs is reset to the initial OLC threshold value. The AP control process then returns to step 102 to resume status message monitoring.

To effectively implement the invention, the initial OLC threshold value is preferably set a low enough level to allow sufficient upward threshold adjustment following an AP shutdown so that one or more remaining operational APs in the message processing system are able to absorb the message processing functions of the non-operating AP without becoming overloaded themselves. The goal is to provide guaranteed service to the cell base stations $10_1, 10_2 \ldots 10_n$. The initial OLC threshold can be determined by performance modeling or by observation of the wireless communication service network 2 during actual or simulated operations. More particularly, the initial threshold can be determined on the basis of processor utilization and message delay considerations with all APs being operational, and following the shut down of an AP with the remaining operational APs carrying an increased load.

For example, it is assumed that there is some maximum CPU utilization rate above which processor resources become strained and message delays increase to unacceptable levels. If this maximum CPU utilization rate is selected as a maximum OLC threshold "M," then there must be some initial OLC threshold "I" such that the threshold M is not exceeded even if one of the APs becomes non-operational and the remaining operational APs must share its load. The value of I will generally vary depending on the number of APs available to accept the message processing functions of a non-operational AP. If only a few operational APs are available, the value of I will be lower than if a large number of operational APs are available. This relationship may be expressed by the equation:

$$I = M(n-1)/n$$

where "I" and "M" are as described above, "n" is the number of total number of APs available for mutual load sharing, and "n−1" is the number of operational APs left after one of the APs fails.

If, for example, there are two APs (n=2) and the maximum acceptable OLC threshold is 80% (M=80), the initial OLC threshold I can be set to be 40% (I=40). If one AP fails, the OLC for the one remaining operational AP can be reset to 80% and this AP will be able to accept the message processing functions of the failed AP without itself becoming overloaded. That is, it will be able to handle its own message processing at a 40% CPU utilization rate, as well as the additional 40% CPU utilization imposed by the non-operating AP.

If there are eight APs (n=8) and the maximum acceptable OLC threshold is 80% (M=80), the initial OLC threshold can be set to 70% (I=70). If one AP fails, the OLC for the seven remaining operational AP can be reset to 80% and these APs will be able to accept the message processing functions of the failed AP without themselves becoming overloaded. That is, they will each be able to handle their own message processing at a 70% CPU utilization rate, as well as a 10% share of the initial 70% CPU utilization previously handled by the non-operating AP.

It will be understood that the APs $50_1, 50_2 \ldots 50_n$ and $52_1, 52_2 \ldots 52_n$ may either be paired or unpaired. If the APs $50_1, 50_2 \ldots 50_n$ and $52_1, 52_2 \ldots 52_n$ are paired, then two APs will be used to service the same group of base stations, so as to provide a measure of redundancy. If the APs $50_1, 50_2 \ldots 50_n$ and $52_1, 52_2 \ldots 52_n$ are not paired, then each AP will separately serve an assigned group of base stations. In configurations where the APs $50_1, 50_2 \ldots 50_n$ and $52_1, 52_2 \ldots 52_n$ are paired, the OLC threshold adjustment step 106 is preferably performed by adjusting the OLC threshold for the paired mate failed AP. The message processing functions of the failed AP are then redistributed in step 108 to this operational AP mate.

If the APs are not paired, the OLC threshold can be adjusted in response to an overload condition for one or more (preferably all) remaining operational APs in the message processing system, or in an AP cluster therein. The message processing functions of the failed AP are then redistributed to these remaining operational APs. The following examples respectively illustrate paired AP and non-paired AP implementations of the invention.

EXAMPLE 1

PAIRED APs

In this example, it is assumed that there is an APC containing eight APs, and wherein there are four pairs of APs assigned to respectively service four groups of cell base stations. An initial OLC threshold of 40% is set for each of the APs. If one of the APs becomes non-operational, the shutdown condition will trigger responsive action by the CP 58. The CP 58 will dynamically increase the OLC threshold of the operational mate of the failed AP to a new level of 80%. The message processing functions of the failed AP will then be off-loaded to the operational AP mate. By dynamically increasing the OLC threshold, the operational AP will have the required 40% additional capacity required to carry the message processing functions of the failed AP, without the operational AP itself becoming overloaded.

EXAMPLE 2

NON-PAIRED APs

In this example, it is assumed that there is an APC containing eight APs assigned to respectively service eight groups of cell base stations. An initial OLC threshold of 70% is set for each of the APs. If one of the APs becomes non-operational, the shutdown condition will trigger responsive action by the CP 58. The CP 58 will dynamically increase the OLC threshold of the remaining non-failed APs to a new level of 80%. The message processing functions of the failed AP will then off-loaded and distributed equally among the remaining operational APs. By dynamically increasing their OLC threshold 10% each, the operational APs will have sufficient capacity to accommodate all of the message processing functions of the non-operating AP, without the operational APs themselves becoming overloaded.

Accordingly, a message control system for a mobile wireless communication system has been described that includes at least two Application Processors (APs), and is dynamically responsive to an AP shutdown condition so as to promote improved load sharing among remaining operational APs and to minimize the likelihood of a catastrophic processing failure. While various embodiments have been disclosed, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In a wireless communication service network that includes a message processing system providing operational, administrative and maintenance support for one or more cell base stations in the network serving one or more wireless radio units, the message processing system including at least two programmable application processors (APs), a method for improving control of message processing resources in said message processing system in response to an AP shutdown condition, comprising:

setting an initial overload control (OLC) threshold for said APs;

monitoring the operation of said APs during message processing;

dynamically adjusting the OLC threshold relative to one or more of said APs in the event that one of said APs becomes non-operational (non-operating AP); and redistributing the message processing functions of said non-operating AP to one or more remaining operational APs in said message processing system.

2. A method in accordance with claim 1 wherein said monitoring and adjusting steps are performed by an AP control processor programmed to perform such functions.

3. A method in accordance with claim 1 wherein said initial threshold setting step includes selecting an initial OLC threshold that allows sufficient upward OLC threshold adjustment to enable said one or more remaining operational APs to absorb all of the message processing functions of said non-operating AP without overload.

4. A method in accordance with claim 1 wherein said initial OLC threshold is determined by performance modeling or by observation of said wireless communication service network.

5. A method in accordance with claim 1 wherein said initial OLC threshold is determined on the basis of processor utilization and message delay considerations with all APs being operational, and following the shut down of an AP with the remaining operational APs carrying an increased load.

6. A method in accordance with claim 1 wherein said initial OLC threshold is determined based on a maximum permissible OLC threshold and on the number of APs available to receive the message processing functions of said non-operating AP.

7. A method in accordance with claim 1 wherein said initial OLC threshold is determined based on the formula I=M(n−1)/n, where "I" is the initial OLC threshold to be determined, "M" is a maximum acceptable OLC threshold, "n" is the number of APs available for mutual load sharing, and "n−1" is the number of operational APs available after one AP becomes non-operational.

8. A method in accordance with claim 1 wherein said APs are paired and wherein said adjusting step includes adjusting said OLC threshold for the paired mate of said non-operating AP.

9. A method in accordance with claim 1 wherein said APs are not paired and wherein said adjusting step includes adjusting said OLC threshold for all remaining operational APs in said message processing system or in an AP cluster therein.

10. A method in accordance with claim 9 wherein said redistributing step includes redistributing the message processing functions of said non-operating AP to all remaining operational APs in said message processing system or in an AP cluster therein.

11. In a wireless communication service network that includes a message processing system providing operational, administrative and maintenance support for one or more cell base stations in the network serving one or more wireless radio units, the message processing system including at least two programmable application processors (APs), a dynamic multi-step overload control system for improving control of message processing resources in said message processing system in response to message overload conditions, comprising:

means for setting an initial overload control (OLC) threshold for said APs;

means for monitoring the operation of said APs during message processing;

means for dynamically adjusting the OLC threshold relative to one or more of said APs in the event that one of said APs becomes non-operational (non-operating AP); and means for redistributing the message processing functions of said non-operating AP to one or more remaining operational APs in said message processing system.

12. A system in accordance with claim 11 wherein said monitoring means and adjusting means are implemented by a separate AP controller programmed to perform such functions, or by said APs themselves.

13. A system in accordance with claim 11 said initial threshold setting means is configured to select an initial OLC threshold that allows sufficient upward threshold adjustment to enable said one or more remaining operational APs to absorb all of the message processing functions of said non-operating AP without overload.

14. A system in accordance with claim 11 wherein said initial OLC threshold is determined by performance modeling or by observation of said wireless communication service network.

15. A system in accordance with claim 11 wherein said initial OLC threshold is determined on the basis of processor utilization and message delay considerations with all APs being operational, and following the shut down of an AP with the remaining operational APs carrying an increased load.

16. A system in accordance with claim 11 wherein said initial OLC threshold is determined based on a maximum permissible OLC threshold and on the number of APs available to receive the message processing functions of said non-operating AP.

17. A system in accordance with claim 11 wherein said initial OLC threshold is determined based on the formula I=M(n−1)/n, where "I" is the initial OLC threshold to be determined, "M" is a maximum acceptable OLC threshold, "n" is the number of APs available for mutual load sharing, and "n−1" is the number of operational APs available after one AP becomes non-operational.

18. A system in accordance with claim 11 wherein said APs are paired and wherein said adjusting means is configured to adjust said OLC threshold for the paired mate of said non-operating AP.

19. A system in accordance with claim 11 wherein said APs are not paired and wherein said adjusting means is configured to adjust said OLC threshold for all remaining operational APs in said message processing system or in an AP cluster therein.

20. A system in accordance with claim 19 wherein said redistributing means is configured to redistribute the message processing functions of said non-operating AP to all remaining operational APs in said message processing system or in an AP cluster therein.

21. A message processing system for a wireless communication service network, comprising:

- at least two application processors (APs) for processing messages on behalf of radio base stations in said wireless communication service network;
- means for setting an initial overload control (OLC) threshold for said APs;
- means for monitoring the operation of said APs during message processing;
- means for dynamically adjusting the OLC threshold relative to one or more of said APs in the event that one of said APs becomes non-operational (non-operating AP); and
- means for redistributing the message processing functions of said non-operating AP to one or more remaining operational APs in said message processing system.

* * * * *